United States Patent
Assaf et al.

(10) Patent No.: US 7,240,540 B2
(45) Date of Patent: Jul. 10, 2007

(54) ROUGH ROAD DETECTION SYSTEM

(75) Inventors: Tameem K. Assaf, Milford, MI (US);
David S. Mathews, Howell, MI (US);
Sanjeev M. Naik, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/263,174

(22) Filed: Oct. 31, 2005

(65) Prior Publication Data
US 2007/0095130 A1  May 3, 2007

(51) Int. Cl.
*G01B 5/28* (2006.01)
(52) U.S. Cl. .......................... 73/105; 73/117.3
(58) Field of Classification Search ................. 73/105, 73/104, 116, 117.2, 117.3, 118.1; 701/29, 701/99, 110, 111
See application file for complete search history.

(56) References Cited

U.S. PATENT DOCUMENTS 4,651,290 A * 3/1987 Masaki et al. ............... 701/80
4,912,967 A * 4/1990 Shiraishi et al. ............ 73/105
5,061,932 A * 10/1991 Tribe et al. .................. 342/70
5,065,618 A * 11/1991 Hodges et al. ............. 73/146
5,668,725 A    9/1997 Naik
6,305,352 B1  10/2001 Dony
2003/0078717 A1* 4/2003 Kawasaki et al. ........... 701/80
2005/0102086 A1* 5/2005 Nakao ........................ 701/80
2006/0136111 A1* 6/2006 Robert et al. ............... 701/65

* cited by examiner

*Primary Examiner*—Eric S. McCall
(74) *Attorney, Agent, or Firm*—Christopher DeVries

(57) ABSTRACT

A rough road detection system includes a collection module, a statistical module, and a comparison module. The collection module collects samples from a vibration sensitive signal. The statistical module removes a periodic anomaly from the samples and removes a random anomaly from the samples with a filter having a filter coefficient based on an engine speed signal. In addition, the statistical module calculates a statistical signal based on the samples. The rough road detection system also includes a derivative module that calculates a first and second derivative based on a rate or time. The derivative module removes negative derivatives when the derivatives are calculated with respect to the rate and positive derivatives when the derivatives are calculated with respect to time. The comparison module determines whether a rough road condition exists based on the statistical signal or the first and second derivatives.

20 Claims, 5 Drawing Sheets

ROUGH ROAD DETECTION SYSTEM

FIELD OF THE INVENTION

The present invention relates to vehicles, and more particularly to a method and apparatus to detect when a vehicle is traversing a rough road.

BACKGROUND OF THE INVENTION

Vehicles include an internal combustion engine that generates drive torque. More specifically, the engine draws in air and mixes the air with fuel to form a combustion mixture. The combustion mixture is compressed within cylinders and is combusted to drive pistons that are slidably disposed within the cylinders. The pistons rotatably drive a crankshaft that transfers drive torque to a transmission and wheels. When the engine misfires, the combustion mixture of a cylinder does not combust at all or only partially, and may cause engine vibration and driveline oscillation.

Engine control systems sometimes include misfire detection systems that determine when the engine misfires. The engine control system can adjust engine operation to reduce engine misfire, thereby improving engine performance and vehicle drivability. Some road conditions can cause the engine control system to incorrectly register a misfire event when one has not actually occurred. For example, rough roads can induce feedback torque on the wheels that can affect rotation of the crankshaft. Abnormal crankshaft rotation is one characteristic of an engine misfire event.

Some misfire detection systems identify misfire events based on changes in engine speed with respect to a reference. The reference represents expected changes in speed of a normal engine operating in similar conditions and may be obtained experimentally by running a vehicle at different operating conditions without misfire. When misfire occurs, the drop in engine torque produces a corresponding drop in engine speed. This speed change is sometimes greater than changes in a reference.

Rough roads also produce changes in engine speed that are similar in magnitude to those generated by engine misfire events. This poses a problem for engine misfire detection systems that rely on changes in engine speed to detect engine misfire events. To prevent the systems from generating false misfire events due to rough roads, the misfire detection system may be disabled when rough roads are detected.

SUMMARY OF THE INVENTION

A rough road detection system according to the present includes a collection module, a statistical module, and a comparison module. The collection module collects samples from a vibration sensitive signal. The statistical module removes a periodic anomaly from the samples and removes a random anomaly from the samples with a filter having a filter coefficient based on an engine speed signal. In addition, the statistical module calculates a statistical signal based on the samples. The comparison module determines whether a rough road condition exists based on the statistical signal.

In other features, the comparison module determines that a rough road condition exists when the statistical signal exceeds a statistical threshold. When the rough road condition exists, an engine misfire system is disabled.

In still other features, the rough road detection system includes a derivative module. The derivative module calculates a derivative of the samples with respect to a rate at which the collection module collects the samples or with respect to time. The derivative module removes negative derivatives when the derivative is calculated with respect to the rate and positive derivatives when the derivative is calculated with respect to time. When the derivative exceeds a derivative threshold, the comparison module determines that the rough road condition exists.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
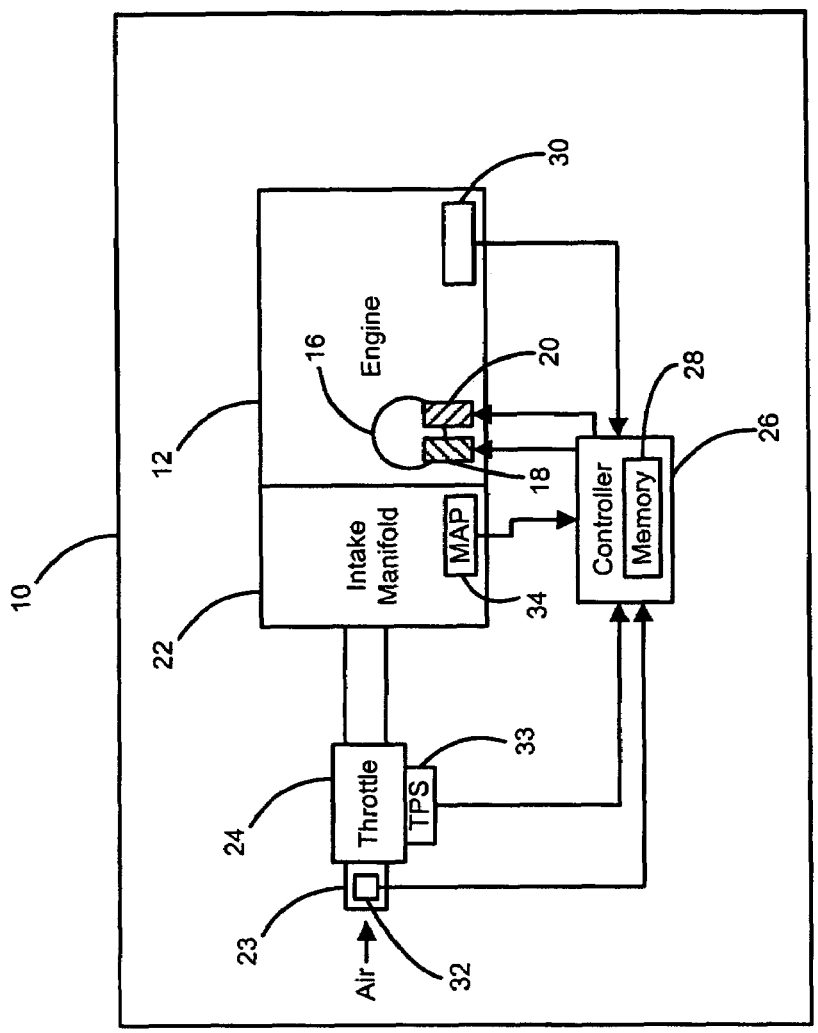
FIG. 1 is a functional block diagram of an exemplary vehicle with a rough road detection system according to the present invention.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 is shown that includes an engine 12 with a cylinder 16 having an associated fuel injector 18 and spark plug 20. Although a single cylinder 16 is shown, it will be appreciated that the engine 12 can include multiple cylinders 16 with associated fuel injectors 18 and spark plugs 20. For example, the engine 12 may include 4, 5, 6, 8, 10, or 12 cylinders 16. Air is drawn into an intake manifold 22 of the engine 12 through an inlet 23. A throttle 24 regulates the air flow into the intake manifold 22. Fuel and air are combined in the cylinder 16 and are ignited by the spark plug 20. Although the spark plug 20 induces combustion of the air/fuel mixture, the engine 12 can be a compression ignition-type engine wherein combustion of the air/fuel mixture is induced without a spark plug.

A controller 26 that includes memory 28 regulates operation of the vehicle 10 including a rough road detection system of the present invention. The controller 26 communicates with a crankshaft position sensor 30 that generates a crank position signal. The controller 26 also communicates with a mass air flow (MAF) sensor 32, a throttle position sensor (TPS) 33, and a manifold absolute pressure (MAP) sensor 34 that generate MAF, TPS, and MAP signals respectively.

The crankshaft position sensor 30 may be responsive to a toothed wheel (not shown) that rotates with a crankshaft (not shown). The toothed wheel includes a plurality of equally spaced teeth that radially extend therefrom. At least one tooth may be missing to define a gap. For example, the toothed wheel can include teeth that are sufficiently sized and spaced to accommodate 60 teeth. However, two teeth are missing for an actual total of 58 teeth disposed about the toothed wheel. The missing teeth define the gap. In this example, each tooth corresponds to 6° of rotation of the crankshaft (i.e., 360°/60 teeth). The gap corresponds to a rotational position of the crankshaft relative to a piston position within a cylinder. For example, the end of the gap can indicate that a particular piston is at top-dead-center (TDC) within its cylinder.

A pulse train is generated as the individual teeth rotate past the crankshaft position sensor 30. Each pulse within the pulse train corresponds to a tooth of the toothed wheel. For the exemplary toothed wheel described above, each pulse indicates 6° of crankshaft rotation. An engine speed signal (RPM) is determined based on the pulse train. While a particular method is described, skilled artisans will appreciate that other systems and methods for sensing engine speed may be used.

The controller 26 determines whether the vehicle 10 is experiencing a rough road condition (i.e., traveling on a rough road) based on the crank position signal. Although the crank position signal is used in this example it should be recognized that any vibration sensitive signal may be used in accordance with the present invention. The controller 26 may collect time stamps, which are defined as the amount of time required for the crankshaft to rotate through a particular angle (e.g., 30°, 60°, 90°, 120°). For example, if an angle of 30° is used, the controller 26 determines the amount of time required for 5 pulses, (i.e., 5 pulses×6°/pulse=30°). The controller 26 calculates first and second derivatives of the time stamps with respect to time or crank speed and determines whether a rough road condition exists based on the first and second derivatives. If the vehicle 10 is experiencing a rough road condition, the controller 26 disables the engine misfire detection system. In this manner, false engine misfire events are reduced due to rough road conditions.

Alternatively, the controller 26 calculates a statistical signal based on the vibration sensitive signal and determines whether a rough road condition exists based on the statistical signal. The statistical signal may be a variance, a standard deviation, a inter-quartile range, or any other statistical calculation that may represent a deviation from sampled data.

Figure 2:
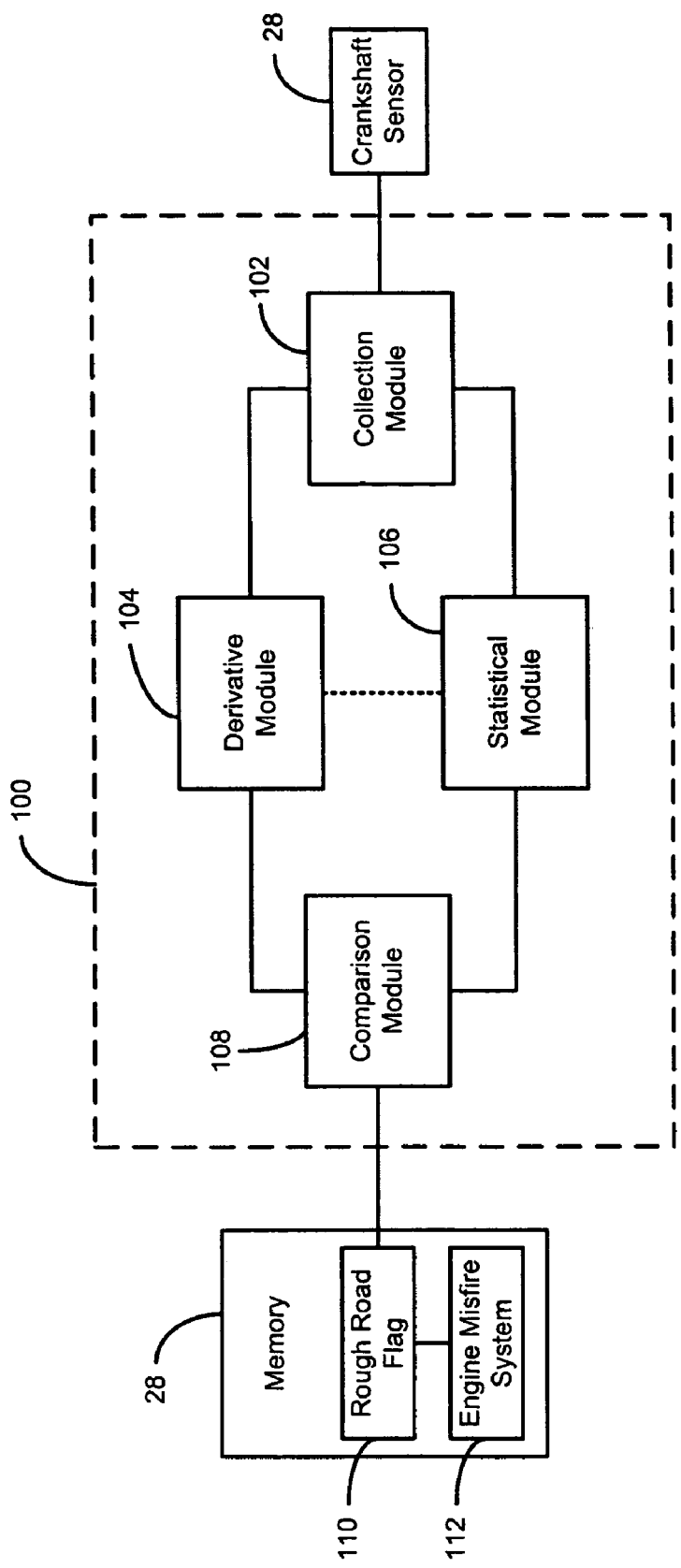
FIG. 2 is a functional block diagram of the rough road detection system according to the present invention.

Referring now to FIG. 2, a rough road detection system 100 includes a collection module 102, a derivative module 104, a statistical module 106, and a comparison module 108.

The collection module 102 collects samples at a specified rate from the crankshaft sensor 30 and communicates the samples to the derivative module 104 and the statistical module 106. Alternatively, the collection module 102 may collect samples from any signal that is sensitive to vehicle vibration.

The derivative module 104 calculates a first and second derivative of each sample with respect to the specified rate, which corresponds to crank speed, and removes any negative derivatives. In this case, negative derivatives are representative of engine misfire and are eliminated to prevent a false diagnosis of a rough road. Alternatively, the derivative module 104 may calculate the first and second derivative of each sample with respect to time and remove any positive derivatives. The derivative module 104 communicates with the comparison module 108 and sends the resulting derivatives to the comparison module 108. Alternatively, the derivative module 104 may communicate with the statistical module 106 as indicated by the dotted line.

The statistical module 106 calculates a statistical signal based on vibration sensitive samples from the collection module 102 and sends the statistical signal to the comparison module 108. Alternatively, the statistical module 106 may calculate the statistical signal from the first and second derivatives. Additionally, any signal that is affected by vehicle vibration may be used in calculating the statistical signal. The statistical signal represents a statistical calculation such as, but not limited to, a variance, a standard deviation, or inter-quartile ranges of vibration sensitive data.

The statistical module 106 also removes periodic and random anomalies from the statistical signal. The statistical signal may be calculated on a single cylinder to remove periodic anomalies due to tooth-to-tooth error in the toothed wheel, torsional effects on the crankshaft, combustion variation from cylinder to cylinder, or continuous engine misfire. Incorporating the same cylinder data over a number of engine cycles tends to minimize periodic anomalies from appearing in the statistical signal. In this case, an absolute standard deviation can be computed for each cylinder across the entire engine cycle and then averaged with other cylinders in the engine resulting in a coefficient of a variation-like estimate of engine behavior. Averaging the absolute standard deviation over an engine cycle tends to result in less variation from cylinder to cylinder. Alternatively, a Fourier series or other periodic approximation known in the art may be used to filter out periodic anomalies from the vibration sensitive signal. One such periodic approximation is described in further detail in commonly assigned U.S. Pat. No. 5,668,725 which is expressly incorporated herein by reference in its entirety.

Random anomalies may be removed with a lag filter such that sporadic changes in the statistical signal are ignored. Removing random anomalies prevents the statistical signal from containing data that is unrepresentative of a rough road. The lag filter may be characterized by the following equation:

$$L[n]=k\cdot(u[n]-L[n-1])+L[n-1]$$

where u[n] is the given input of sample n and k is a lag coefficient.

Figure 3:
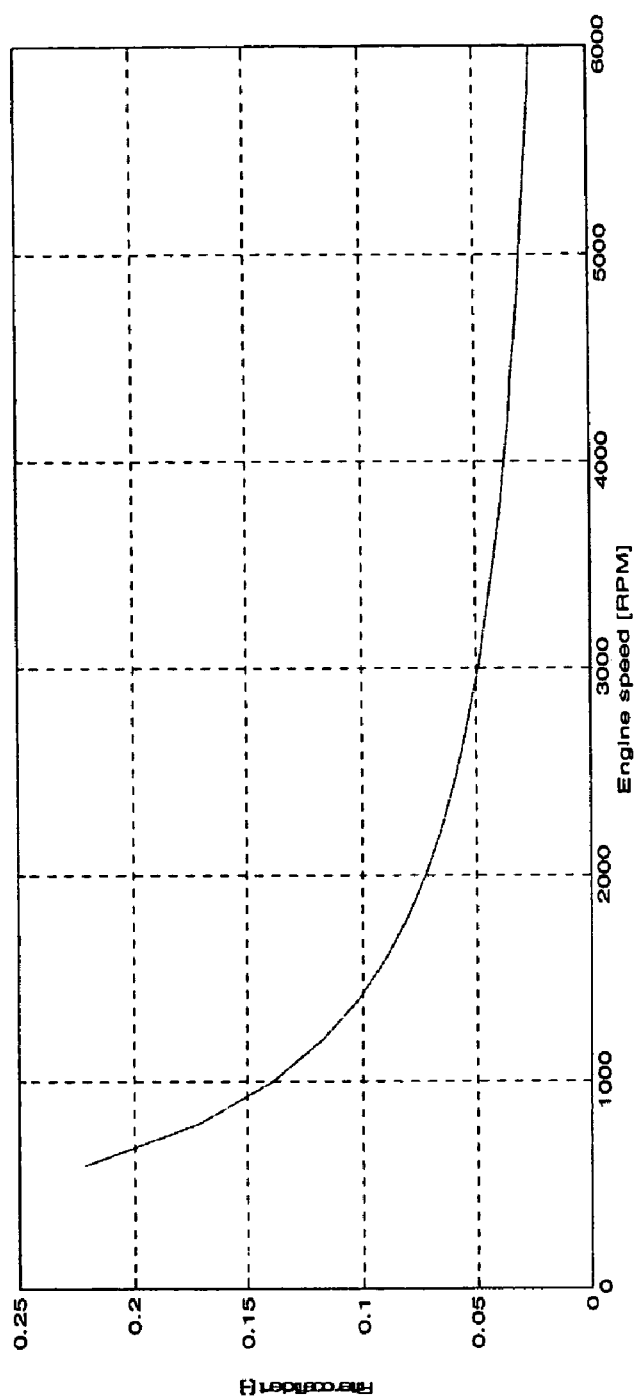
FIG. 3 is an exemplary plot of a filter coefficient as a function of engine crankshaft speed.

The lag coefficient, k, is based on engine speed and may be characterized by the following equation:

$$k=1-e^{-\omega \cdot t}$$

where $\omega$ is the filter bandwidth and t is the sampling time. The filter bandwidth, $\omega$, corresponds to engine cycle frequency. For example, if the engine speed is 1200 revolutions per minute, the filter coefficient may be 0.1175. Exemplary filter coefficients, k, are shown for various engine speeds in FIG. 3.

Random anomalies may also be removed by limiting sampled data to a range where engine misfire does not occur. When the vehicle 10 experiences aggressive driving maneuvers, transients may be removed from the statistical signal by removing a centered average of the sampled data over a predetermined number of engine cycles.

Referring back to FIG. 2, the comparison module 108 compares the first and second derivatives calculated by the derivative module 104 to a first and second derivative threshold respectively. Any derivatives greater than the respective derivate threshold are considered to be outside of normal engine operating conditions. The comparison module 108 also compares the statistical signal calculated by the statistical module 106 to a statistical threshold. The statistical threshold, which is determined experimentally, is similar to the derivate threshold and represents a statistical calculation outside of normal engine operating conditions. If the derivatives calculated by the derivative module 104 exceed the respective derivate threshold or the statistical signal exceeds the statistical threshold, the comparison module 108 sets a rough road flag 110 in memory 28. If the thresholds have not been exceeded, the comparison module 108 clears the rough road flag 110. The rough road flag 110 communicates with an engine misfire system 112. When the rough road flag 110 is set, the engine misfire system 112 is disabled.

Figure 4:
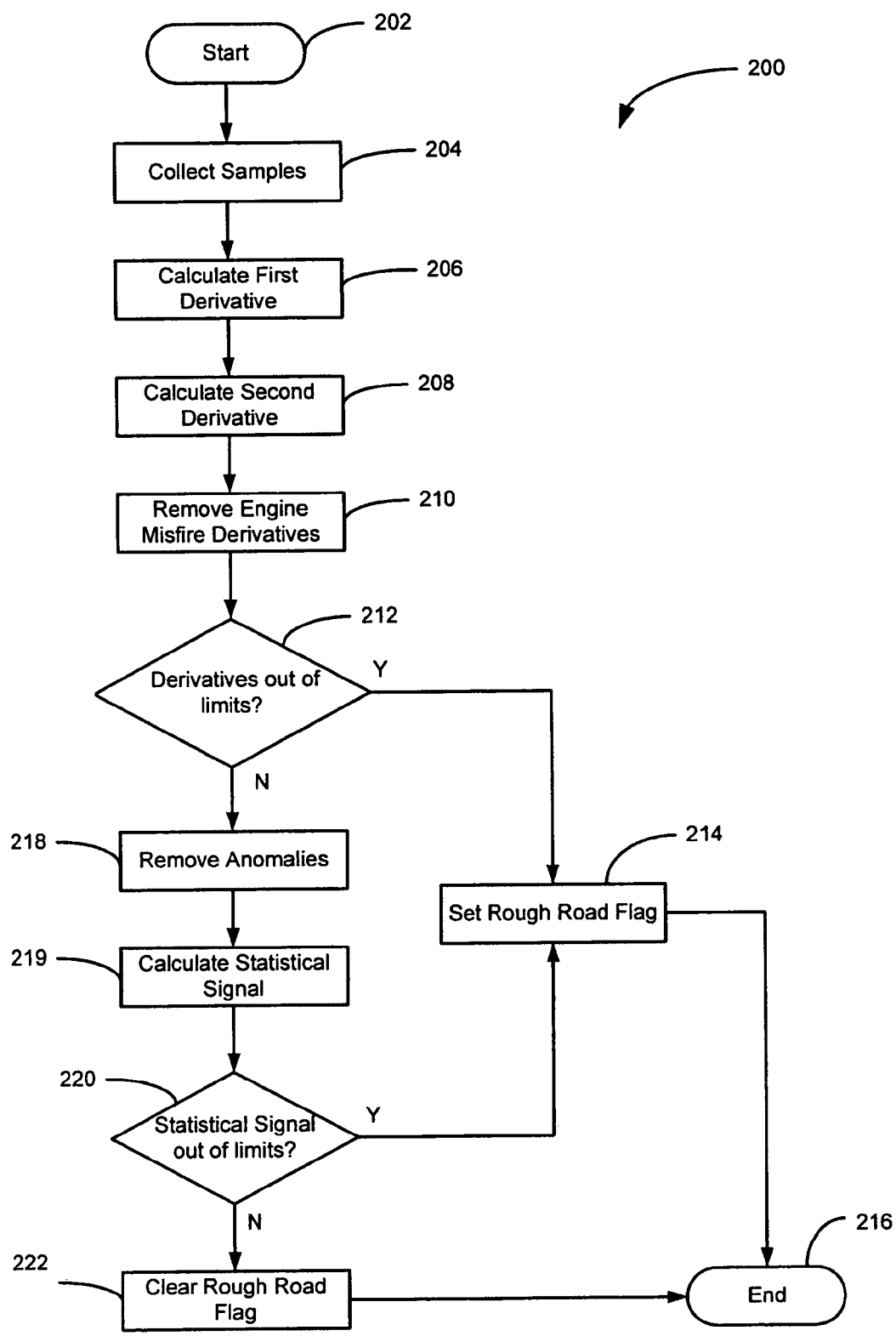
FIG. 4 is a flowchart illustrating exemplary steps performed by the rough road detection system of the present invention.

Referring now to FIG. 4, the rough road detection system 100 implements a method generally identified at 200 to detect a rough road. The method starts at step 202 when the vehicle 10 is started. In step 204, the collection module 102 collects vibration sensitive samples. In step 206, the derivative module 104 calculates the first derivative of the samples. The derivative module 104 calculates the second derivative of the samples in step 208. In step 210, the derivative module 104 removes any derivatives representative of an engine misfire that were calculated in steps 206 and 208. More specifically, if the first and second derivative are calculated with respect to time, the derivative module 104 removes positive derivatives. If the first and second derivatives are calculated with respect to crank speed, the derivative module 104 removes negative derivatives.

The comparison module 108 determines whether the calculated first and second derivatives exceed the first and second derivative threshold respectively in step 212. As previously discussed, the derivative thresholds are exceeded when the engine 12 is operating out of normal operating conditions. If the first and second derivatives exceed the respective thresholds, the comparison module 108 sets the rough road flag 110 in step 214 and the method ends in step 216. If the first and second derivatives do not exceed the respective thresholds, the statistical module 106 removes any anomalies in step 218. In step 219, the statistical module 106 calculates the statistical signal. The comparison module 108 determines whether the statistical signal exceeds the statistical threshold in step 220. As previously discussed, the statistical threshold is exceeded when the engine 12 is operating out of normal operating conditions. If the statistical threshold is exceeded, the comparison module 108 sets the rough road flag 110 in step 214 and the method ends in step 216. If the statistical signal does not exceed the statistical threshold, the comparison module 108 clears the rough road flag 110 in step 222 and the method ends in step 216.

Figure 5:
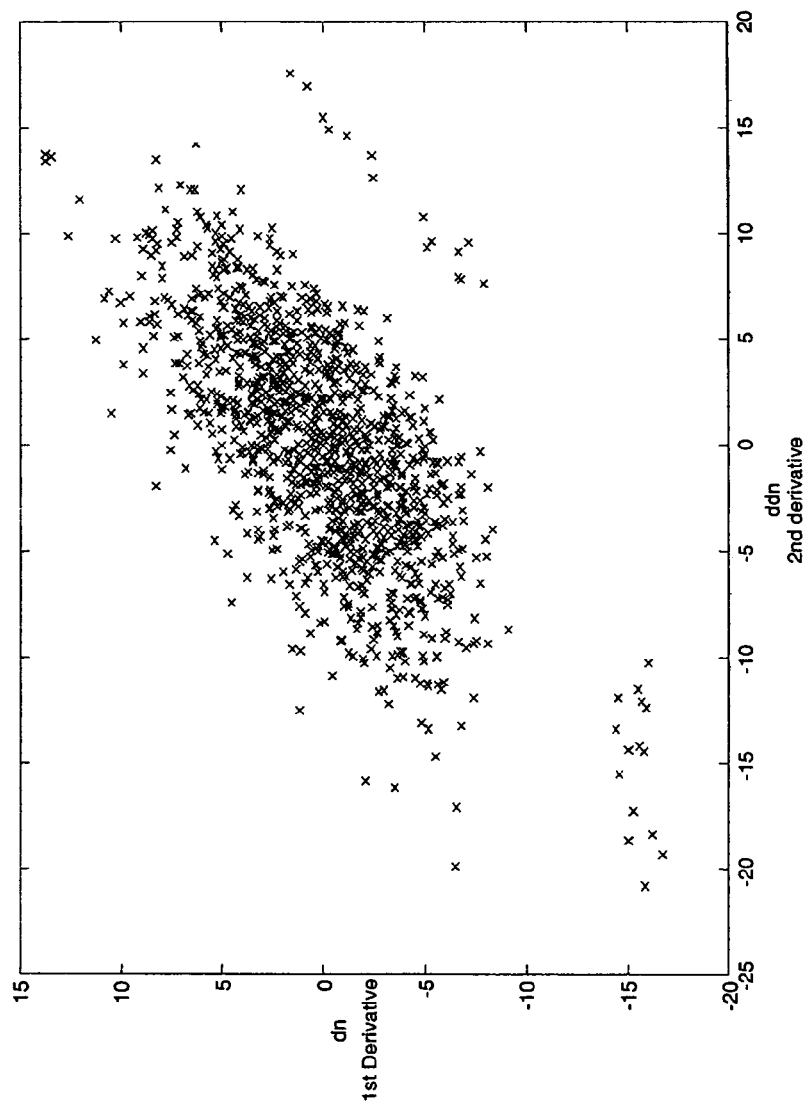
FIG. 5 is an exemplary plot of crankshaft time stamps.

Referring now to FIG. 5, an exemplary state space of crankshaft behavior during a specific time period is shown. Each data point represents an engine speed that corresponds with an amount of time required for a crankshaft to rotate through a particular angle. Exemplary angles may include 30°, 60°, 90° and 120°. The first and second derivative of each sample is plotted against each other to create the state space. Specific patterns of the data points are indicative of engine operation. Highly spread out data points tend to indicate a rough road. Engine misfire and engine deceleration are indicated when the first and the second derivatives are negative. To prevent false diagnosis the rough road detection system 100 only uses positive first and second derivatives (assuming the derivatives are with respect to crank speed) to determine whether the vehicle 10 is traversing a rough road.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A rough road detection system, comprising:
 a collection module that collects samples from a vibration sensitive signal;
 a statistical module that removes a periodic anomaly from said samples, that removes a random anomaly from said samples with a filter having a filter coefficient based on an engine speed signal, and that calculates a statistical signal based on said samples;
 a derivative module that calculates a derivative of said samples; and
 a comparison module that communicates with said statistical module and determines whether a rough road condition exists based on said statistical signal and said derivative.

2. The rough road detection system of claim 1 wherein said rough road condition exists when said comparison module determines that said statistical signal exceeds a statistical threshold.

3. The rough road detection system of claim 2 wherein an engine misfire system is disabled when said rough road condition exists.

4. The rough road detection system of claim 3, wherein said derivative module calculates said derivative of said samples with respect to at least one of a rate at which said collection module collects said samples and time, wherein said derivative module removes negative derivatives when said derivative is calculated with respect to said rate, and wherein said derivative module removes positive derivatives when said derivative is calculated with respect to time.

5. The rough road detection system of claim 4 wherein said rough road condition exists when said comparison module determines that said derivative exceeds a derivative threshold.

6. The rough road detection system of claim 5 wherein said statistical signal is based on said derivative.

7. A rough road detection system, comprising:
 a collection module that collects samples from a vibration sensitive signal;
 a derivative module that calculates a first and second derivative of said samples; and
 a comparison module that communicates with said derivative module and determines whether a rough road condition exists.

8. The rough road detection system of claim 7 wherein:
 said collection module collects said samples at a specified rate;
 said derivative module calculates said first and second derivatives with respect to at least one of said specified rate and time;
 said derivative module removes negative derivatives when said first and second derivatives are calculated with respect to said specified rate; and
 said derivative module removes positive derivatives when said first and second derivatives are calculated with respect to time.

9. The rough road detection system of claim 8 wherein said rough road condition exists when said comparison module determines that said first derivative exceeds a first derivative threshold and said second derivative exceeds a second derivative threshold.

10. The rough road detection system of claim 9 wherein an engine misfire system is disabled when said rough road condition exists.

11. A method to detect a rough road, comprising:
collecting samples of a vibration sensitive signal;
removing a periodic anomaly from said samples;
removing a random anomaly from said samples with a filter having a filter coefficient based on an engine speed signal;
calculating a statistical signal based on said samples;
calculating a derivative of said samples; and
determining whether a rough road condition exists based on said statistical signal and said derivative.

12. The method of claim 11 wherein said rough road condition exists when said statistical signal exceeds a statistical threshold.

13. The method of claim 12 further comprising disabling an engine misfire system when said rough road condition exists.

14. The method of claim 13 further comprising:
collecting said samples at a specified rate;
calculating said derivative of said samples with respect to at least one of said specified rate and time;
removing negative derivatives when said derivative is calculated with respect to said specified rate; and
removing positive derivatives when said derivative is calculated with respect to time.

15. The method of claim 14 wherein said rough road condition exists when said derivative exceeds a derivative threshold.

16. The method of claim 15 wherein said statistical signal is based on said derivative.

17. A method of regulating operation of an engine, comprising:
collecting samples from a vibration sensitive signal;
calculating a first and second derivative of said samples;
determining whether a rough road condition exists based on said first and second derivative; and
regulating operation of an engine misfire system based on whether said rough road condition exists.

18. The method of claim 17 further comprising:
collecting said samples at a specified rate;
calculating said first and second derivatives with respect to at least one of said specified rate and time;
removing negative derivatives when said first and second derivatives are calculated with respect to said specified rate; and
removing positive derivatives when said first and second derivatives are calculated with respect to time.

19. The method of claim 18 wherein said rough road condition exists when said first derivative exceeds a first derivative threshold and said second derivative exceeds a second derivative threshold.

20. The method of claim 19 further comprising disabling said engine misfire system when said rough road condition exists.

* * * * *